March 18, 1924.
T. R. EVANS
SPECTACLES
Filed July 11, 1922
1,487,222
REISSUED AS NO. 16553 FEB 2 1927
Fig.1.
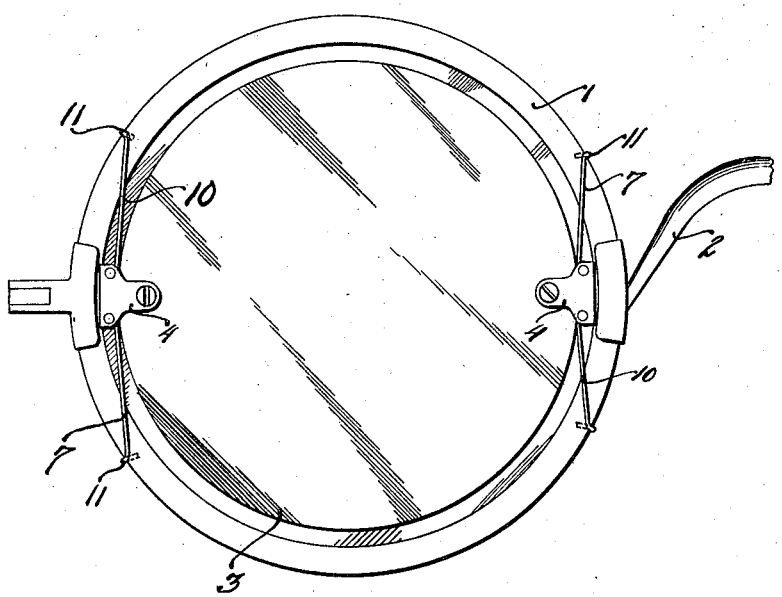
Fig.2.
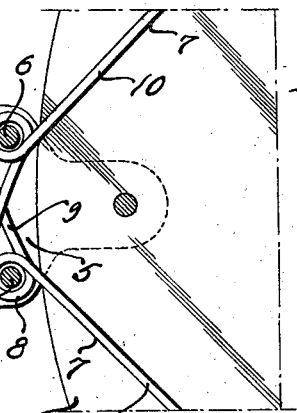
Fig.3.
Fig.4.
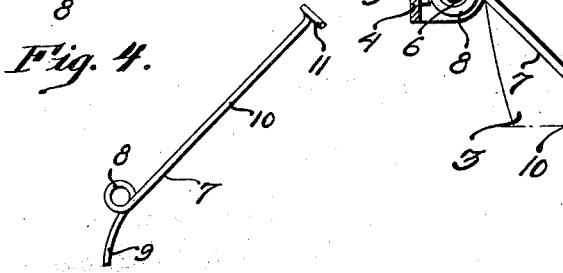
Witnesses
George A. Gues
Elizabeth Garbe
Inventor
Thomas R. Evans
By Joshua R. H. Potts
his Attorney Patented Mar. 18, 1924.

1,487,222

UNITED STATES PATENT OFFICE.

THOMAS R. EVANS, OF PHILADELPHIA, PENNSYLVANIA.

SPECTACLES.

Application filed July 11, 1922. Serial No. 574,319.

*To all whom it may concern:*

Be it known that I, THOMAS R. EVANS, a citizen of the United States, residing at Philadelphia, in the county of Philadelphia and State of Pennsylvania, have invented certain new and useful Improvements in Spectacles, of which the following is a specification.

My invention relates to spectacles or eyeglasses and the object of the invention is to provide means whereby an additional lens may be easily and quickly attached to or detached from an ordinary lens rim. The invention is especially useful for persons who require vision glasses for out of door use and who have occasion to use tinted glasses for automobile riding or the like. My invention consists in the parts and combination and arrangement of parts hereinafter described and claimed.

In the drawings:—

Figure 1 is a front elevation of spectacle lens rim with my improvement in attached position.

Figure 2 a partial edge view of the same.

Figure 3 a sectional view on line 3—3 of Figure 2, and

Figure 4 a detail view of one of the spring wires employed in attaching the additional lens.

The word spectacles will be used herein as denoting vision glasses with or without temple arm or bows.

In the drawings the numeral 1 indicates one of the lens rims and 2 the nose bridge of a pair of spectacles. 3 indicates a supplementary lens independent of the vision lens, such as a tinted lens, and 4 clips, of approximately U-shape, secured to the supplementary lens by rivets. The clips, at their outer ends, include a chamber 5 in which are mounted two posts 6 with a substantial space between them. 7 indicates spring holding wires, each having a coiled part 8 adapted to encircle a post 6, an arm 9 adapted to extend to the rear of the other post and be held between the post and the outer wall of the clip, and an arm 10 provided at its free end with a hook 11 adapted to engage the lens rim 1. The parts are assembled by placing a coil of each spring holding wire about one of the posts with its short arm extending to the rear of the other post then attaching the clip to the lens. The holding arms will then occupy the position shown in Figure 3. Oppositely positioned clips with holding wires are attached to each supplemental lens.

The supplemental lens may be attached to the rim of the spectacle lens by bending the spring arms back and engaging the hooks over the rim. The spring arms will then occupy the position shown in Figure 1. The supplemental lens may be detached by simply releasing the hooks, and the lens may be attached or detached almost instantaneously.

I prefer to make one pair of spring arms longer than the co-operating pair so that in attaching the lens one pair will yield to a greater extent than the other.

While I have described my invention as taking a particular form it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. Means for attaching supplemental lenses to spectacles consisting of clips secured to the supplemental lens, and spring wires having one end coiled and mounted in the clips and the other end adapted to engage a lens rim of the spectacles.

2. Means for attaching supplemental lenses to spectacles consisting of clips carrying posts and secured to the supplemental lens, spring wires coiled about the posts each wire having an arm adapted to engage the wall of the clip and an arm adapted to engage the rim of a spectacle lens.

3. Means for attaching supplemental lenses to spectacles consisting of clips secured to the opposite edges of the supplemental lens, and a pair of spring wires for each clip, each pair of wires having one of their ends mounted in the clip and the other ends diverging from the clip and adapted to engage the lens rim of the spectacles.

4. Means for attaching supplemental lenses to spectacles consisting of clips secured to the opposite edges of the supplemental lens, and a pair of spring wires for each clip, each pair of wires having one of their ends coiled and mounted in the clip and the other ends diverging from the clip and adapted to engage a lens rim of the spectacles.

5. Means for attaching supplemental lenses to spectacles consisting of clips carrying posts and secured to the supplemental lens, and a pair of spring wires for each clip, each pair of wires having one of their ends coiled about the posts and the other ends diverging from the clip and adapted to engage the lens rim of the spectacles.

6. Means for attaching supplemental lenses to spectacles consisting of clips secured to the supplemental lens; a pair of spring wires for each clip, each pair of wires having one of their ends mounted in the clip, the other ends diverging from the clip and provided with a hook adapted to engage a lens rim of the spectacles.

In testimony whereof I have signed my name to this specification in the presence of two subscribing witnesses.

THOMAS R. EVANS.

Witnesses:
 FRANK QUINLAN,
 CHAS. E. POTTS.